US 11,463,433 B1

United States Patent
Chiruvolu et al.

(10) Patent No.: US 11,463,433 B1
(45) Date of Patent: Oct. 4, 2022

(54) SECURE BEARER-SENSITIVE AUTHENTICATION AND DIGITAL OBJECT TRANSMISSION SYSTEM AND METHOD FOR SPOOF PREVENTION

(71) Applicants: Arpitha Chiruvolu, Plano, TX (US); Girish Chiruvolu, Plano, TX (US)

(72) Inventors: Arpitha Chiruvolu, Plano, TX (US); Girish Chiruvolu, Plano, TX (US)

(*) Notice: Subject to any disclaimer, the term of this patent is extended or adjusted under 35 U.S.C. 154(b) by 237 days.

(21) Appl. No.: 16/707,072

(22) Filed: Dec. 9, 2019

Related U.S. Application Data

(60) Provisional application No. 62/785,709, filed on Dec. 28, 2018.

(51) Int. Cl.
  *G06F 21/00* (2013.01)
  *H04L 9/40* (2022.01)
  *H04L 9/06* (2006.01)
  *H04L 101/622* (2022.01)

(52) U.S. Cl.
  CPC ........ *H04L 63/0838* (2013.01); *H04L 9/0643* (2013.01); *H04L 63/0869* (2013.01); *H04L 63/1416* (2013.01); *H04L 63/1425* (2013.01); *H04L 63/1433* (2013.01); *H04L 63/1483* (2013.01); *H04L 2101/622* (2022.05)

(58) Field of Classification Search
  CPC ............ H04L 63/0838; H04L 63/1483; H04L 63/1425; H04L 63/1416; H04L 61/6022; H04L 63/0869; H04L 9/0643; H04L 63/1433
  See application file for complete search history.

(56) References Cited

U.S. PATENT DOCUMENTS

| | | | | |
|---|---|---|---|---|
| 9,886,475 | B1* | 2/2018 | Lin | H04L 67/42 |
| 2008/0040613 | A1* | 2/2008 | Challener | H04L 9/0863 713/185 |
| 2009/0287921 | A1* | 11/2009 | Zhu | H04L 63/0869 713/155 |
| 2013/0013921 | A1* | 1/2013 | Bhathena | H04L 9/0825 713/168 |
| 2013/0042111 | A1* | 2/2013 | Fiske | H04L 9/3239 713/170 |

(Continued)

*Primary Examiner* — Kendall Dolly
*Assistant Examiner* — Michael M Lee
(74) *Attorney, Agent, or Firm* — Michael Diaz

(57) ABSTRACT

An authentication system for detecting a phishing attack by a Man in Middle (MIM) on an end-user. The system includes a communicating device of the end-user and an authentication server for determining if a MIM (spoofing) or the end-user is communicating with the authentication server. The communicating device includes a bearer sensitive one-time password (BOTP) generator for generating a specific BOTP specifically associated with the communicating device where the BOTP is derived using a unique differentiating observable attribute (UDOA) of the communicating device. The communicating device sends the BOTP to the authentication server which uses the perceived UDOA of the received BOTP and calculates an authenticator server BOTP. The authentication server also determines if the received BOTP matches the BOTP calculated by the authenticating server and terminates/rejects the session if the BOTPs do not match. A similar system and method may be utilized to authenticate a digital object.

29 Claims, 10 Drawing Sheets

(56) References Cited

U.S. PATENT DOCUMENTS

| | | | | |
|---|---|---|---|---|
| 2014/0037074 A1* | 2/2014 | Bravo | ............... | H04L 61/106 |
| | | | | 379/88.01 |
| 2014/0365780 A1* | 12/2014 | Movassaghi | ......... | H04L 9/3228 |
| | | | | 713/184 |
| 2015/0365402 A1* | 12/2015 | Woo | ..................... | H04L 63/18 |
| | | | | 726/6 |
| 2016/0301688 A1* | 10/2016 | Baca | ................ | H04L 63/0861 |
| 2017/0244730 A1* | 8/2017 | Sancheti | ............ | H04W 12/06 |
| 2020/0065472 A1* | 2/2020 | Son | ..................... | G06F 21/44 |

\* cited by examiner

FIG. 7

SECURE BEARER-SENSITIVE AUTHENTICATION AND DIGITAL OBJECT TRANSMISSION SYSTEM AND METHOD FOR SPOOF PREVENTION

RELATED APPLICATIONS

This utility application claims the benefit of U.S. Provisional Patent Application Ser. No. 62/785,709 by Arpitha Chiruvolu and Girish Chiruvolu filed Dec. 28, 2018 and is hereby incorporated by reference.

BACKGROUND OF THE INVENTION

Field of the Invention

This invention relates to authentication systems and methods. Specifically, and not by way of limitation, the present invention relates to an authentication system and method that verifies the authenticity of the source of origin as in the case of digitally transmitted objects such as access tokens, cookies, files, etc. that the conveyor claims to be as well as detecting and preventing man-in-middle (MIM) and phishing attacks.

Description of the Related Art

Security and privacy of online data and services are of utmost concern to most consumers utilizing the Internet. There have been many systems and methods employed to provide security and privacy to the Internet user. Authentications systems are often used to authenticate and verify the identity of a user attempting to access online stored data. There are several authentication mechanisms ranging from the utilization of passwords to a plethora of multi-factor authentication systems going beyond passwords. Passwords are susceptible to phishing and man-in-middle (MIM) attacks where the user reveals the password involuntarily. When it comes to one-time passcode generators such as RSA tokens (Hash-based Message Authentication Code (HMAC) based One Time Password (OTP)), Google® authenticator which is a time-based OTP among others, which can all be phished out by MIM attacks. This is because the OTPs generated are like bearer tokens meaning whoever possesses them can submit and use them as the originating end-user. This bearer token is exemplified when one carries money as cash. If the cash changes hands through stealing, robbing and other means, whoever is in possession of such cash can use the money. As such the OTPs generated by the current industry fall short of protecting end-user credentials as both the password and OTP can be stolen by the MIM and can be used for impersonation of the end-user (victim).

FIG. 1 is a simplified block diagram illustrating a MIM attack. In such an attack, an end-user (victim in this case) 10 is lured into clicking a URL link through phishing emails sent by a MIM 12. This results in the end-user's browser/app communicating with a MIM server 14. In such cases, the MIM serve acts as a proxy and submits requests and responses on behalf of the victim end-user to an authentication system 16 of an entity 18 (e.g., bank) and eventually results in hijacking by the MIM 12 of the account and session of the entity 18. This is easily accomplished by the MIM 12 sending the phishing email to the end-user 10. The end-user 10 then clicks on the URL which appears to be for the website of the entity 18 but is a site of the MIM 12. The MIM 12 asks for the account username and password as well as an OTP. The MIM server 14 receives this information and communicates with the entity 18, acting as the end-user 10. The entity provides access to the account at the entity because the MIM has all the requisite credentials (username, password, and OTP). Thus, existing authentication systems utilize a "bearer can use" scheme which lets anyone with the proper username, password and possibly OTP to access an account.

In order to solve this "bearer can use" nature of the passwords and OTPs, an organization, the Fast Identity Online (FIDO) alliance was formed and had come up with Universal $2^{nd}$ Factor (U2F) tokens that are essentially public-private key pair methodology wherein the end-user relies on a device and authenticator agent that signs a challenge presented by the authentication server and is further attested by the browser that indeed the signature of the challenge came from the end-user. The attestation is to ensure that the man-in-middle cannot attest as the MIM does not have the private key of the end-user and thus the bearer of attestation cannot claim the identity of the end-user. However, the FIDO methodology suffers from several distinct disadvantages. The FIDO methodology requires "heavy lifting" of several components on a user's browser, a U2F USB-based key generation and storage for private encryption keys as well as an authentication server requiring a change from existing methodologies. In addition, it puts significant trust and faith on the end-user's authenticator and agent. The FIDO methodology also relies on potentially insecure methods of authentication against the end-user's face, fingerprint, voice, etc. that are not confidential secrets. Enterprises that do not monitor and maintain a security posture of the end-user's devices can certainly be at "unknown" risk and have to trust that all is secure at the user's end. In addition to the above mentioned potential vulnerabilities, the FIDO and any systems that eventually relies on a "central database" holding public keys do not eliminate the risk of replacement of the public keys, by an attackers public keys and commit account takeovers or further denial of service. Furthermore, carrying anything other than a mobile or smart phone is not ideal or practical for most end-users, such as a necessity of carrying a USB stick. In addition, if a USB U2F device is lost or stolen, re-registration, replacement provides a significant burden on resources, time and money. It would be advantageous to have a system and method which does not require the additional use of hardware or requires heavy lifting by the user's browser and authentication agent.

It is also necessary to verify the submitting source of any received digital object. The digital object can take various forms including but not limited to access tokens, digital files, digital currency and any other form of exchanged data. The digital signatures are traditionally used to "sign" and attest the digital objects of interest, as in public-private key encryption. The digital signature with private key conveys the authenticity of the signature assuming that the private key is held by the legitimate owner. However, the digitally signed objects are still "bearer" instruments, in that the holder of the signed object can spoof or illegitimately submit the bearer (holder) agnostic signed digital object. In this context, while digital watermark techniques exist, none of them address the issue of a "Man-in-Middle" submitting the stolen digitally signed and watermarked documents over the Internet and thus opening the vulnerability at the access granting systems, of giving access to protected assets or allowing the submitter (attacker/MIM) to perform privileged transactions. It would be advantageous to account for the UDOAs and recalculate the expected digital Bearer-sensitive digital footprint of the submitting/communicating source to detect any MIM or spoofed submission of the digitally signed and/or water marked digital objects.

SUMMARY OF THE INVENTION

In one aspect, the present invention is an authentication system for detecting a spoofing of victim's credentials through a phishing attack by a Man in Middle (MIM) on an end-user (victim). The system includes a communicating device (agent) of the end-user through a pre-determined secure channel and an authentication server for determining if a MIM or then end-user is communicating with the authentication server. The communicating device includes a bearer sensitive one-time password (BOTP) generator for generating a specific BOTP specifically associated with the communicating device where the BOTP is derived using a unique differentiating observable attributes (UDOA) of the communicating device. The communicating device sends the BOTP to the authentication server. The authentication server determines the perceived UDOAs of the communicating device (agent) that submits the BOTP and calculates an authenticator server BOTP based on pre-determined secrets and the UDOAs. The authentication server also determines if the received BOTP matches the BOTP calculated by the authenticating server and invalidates the submitted OTP leading to a potential termination the session if the BOTPs do not match.

In another aspect, the present invention is a method of detecting spoofed credentials through a phishing attack by a MIM on an end-user (victim). The method begins by calculating a BOTP specifically associated with a communicating device of the end-user, the BOTP being derived using UDOAs of the communicating device and any combination of the pre-shared secrets. The BOTP is then sent to the authentication server. The UDOA of the communicating device is then determined by the authentication server which in turn calculates an authenticator server BOTP. Additionally, the authentication server determines if the received BOTP matches the BOTP and terminates the communication session if the received BOTP does not match the BOTP calculated by the authentication server.

In another aspect of the present invention, the end-user communicating device (agent) communicates directly with a receiving system to compute a Bearer-sensitive Digital Object Footprint (BDOF) based on the conveyed UDOA(s) by the receiving system, any pre-agreed attribute of the digital object that is sent, and at least one pre-shared secret. Upon calculation, the digital object is sent along with the computed BDOF to the receiving system. The receiving system, and upon receiving the digital object, computes the BDOF based on the UDOA of the communicating entity, a pre-agreed attribute of the digital object and the pre-agreed shared secret and determines if the received BDOF matches with computed BDOF. If the BDOFs do not match, an MIM attack is detected, and the receiving system rejects the digital object and any transactions associated with the exchange.

BRIEF DESCRIPTION OF THE DRAWINGS

FIG. 7 illustrates a challenge grid;

DESCRIPTION OF THE INVENTION

The present invention is an authentication system and method of detecting and preventing MIM and phishing attacks. One form of attack involves Address Resolution Protocol (ARP) spoofing which is a type of attack where a malicious actor sends false ARP messages over a local area network resulting in the linking of an attacker's media access control (MAC) address with the IP address of a legitimate computer or server on the network. Once the attacker's MAC address is connected to an authentic IP address, the attacker begins receiving any data that is intended for that IP address. ARP spoofing can enable malicious parties to intercept, modify or even stop data in-transit. Where a MIM is present within the same network as the victim end-user's computer and the end-user's computer is attacked, the necessary ARP spoofing or domain name system (DNS) poisoning can be addressed by utilizing several recommended measures for detecting, preventing and protecting against ARP spoofing attacks. One method includes utilizing packet filtering. Packet filters inspect packets as they are transmitted across a network. Packet filters are useful in ARP spoofing prevention because they are capable of filtering out and blocking packets with conflicting source address information (packets from outside the network that show source addresses from inside the network and vice-versa). Next, trust relationships should be avoided. Organizations should develop protocols that rely on trust relationships as little as possible. Trust relationships rely only on IP addresses for authentication, making it significantly easier for attackers to run ARP spoofing attacks when they are in place. Additionally, it is recommended to use ARP spoofing detection software. There are many programs available that help organizations detect ARP spoofing attacks. These programs work by inspecting and certifying data before it is transmitted and blocking data that appears to be spoofed.

Figure 1:
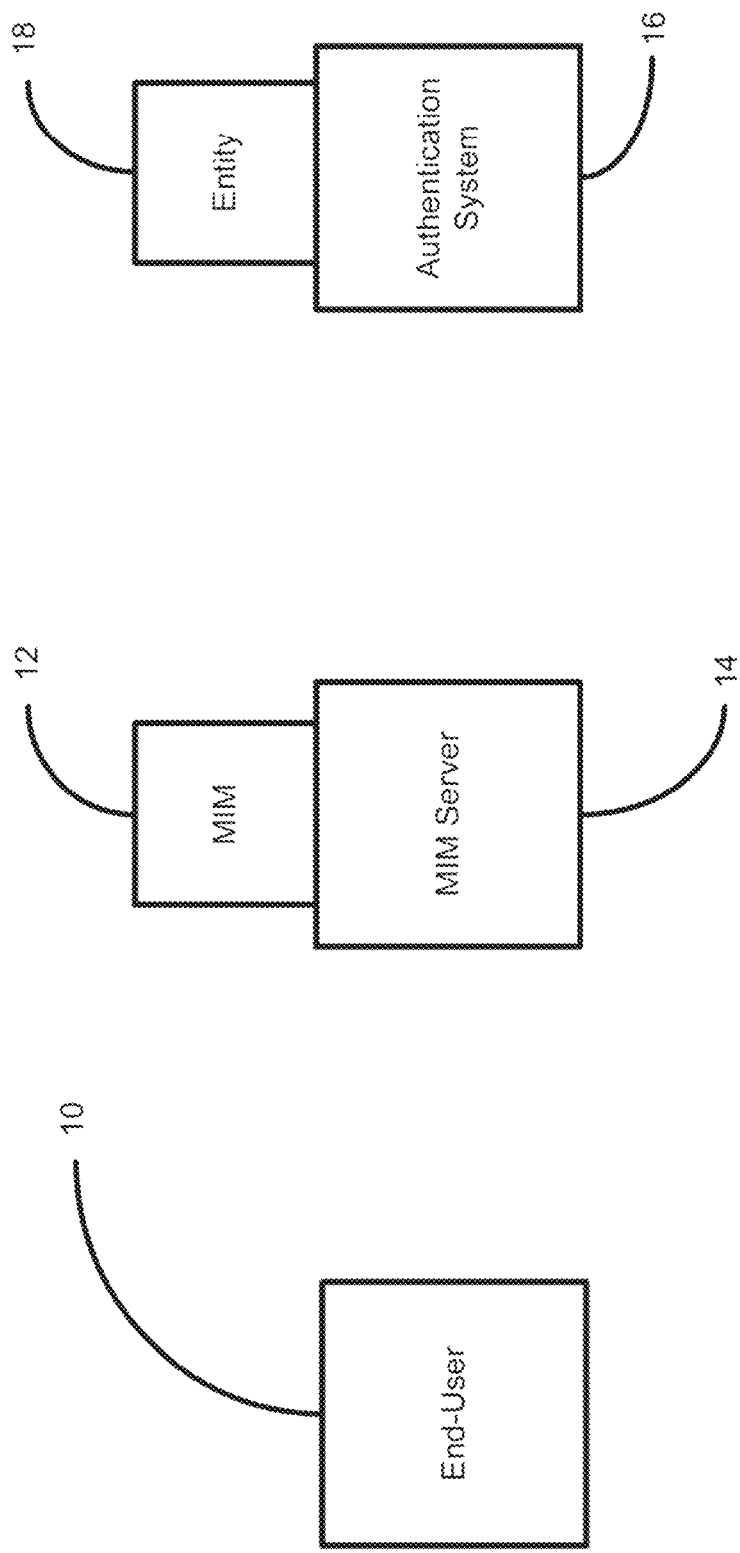
FIG. 1 (prior art) is a simplified block diagram illustrating a MIM attack.
Figure 2:
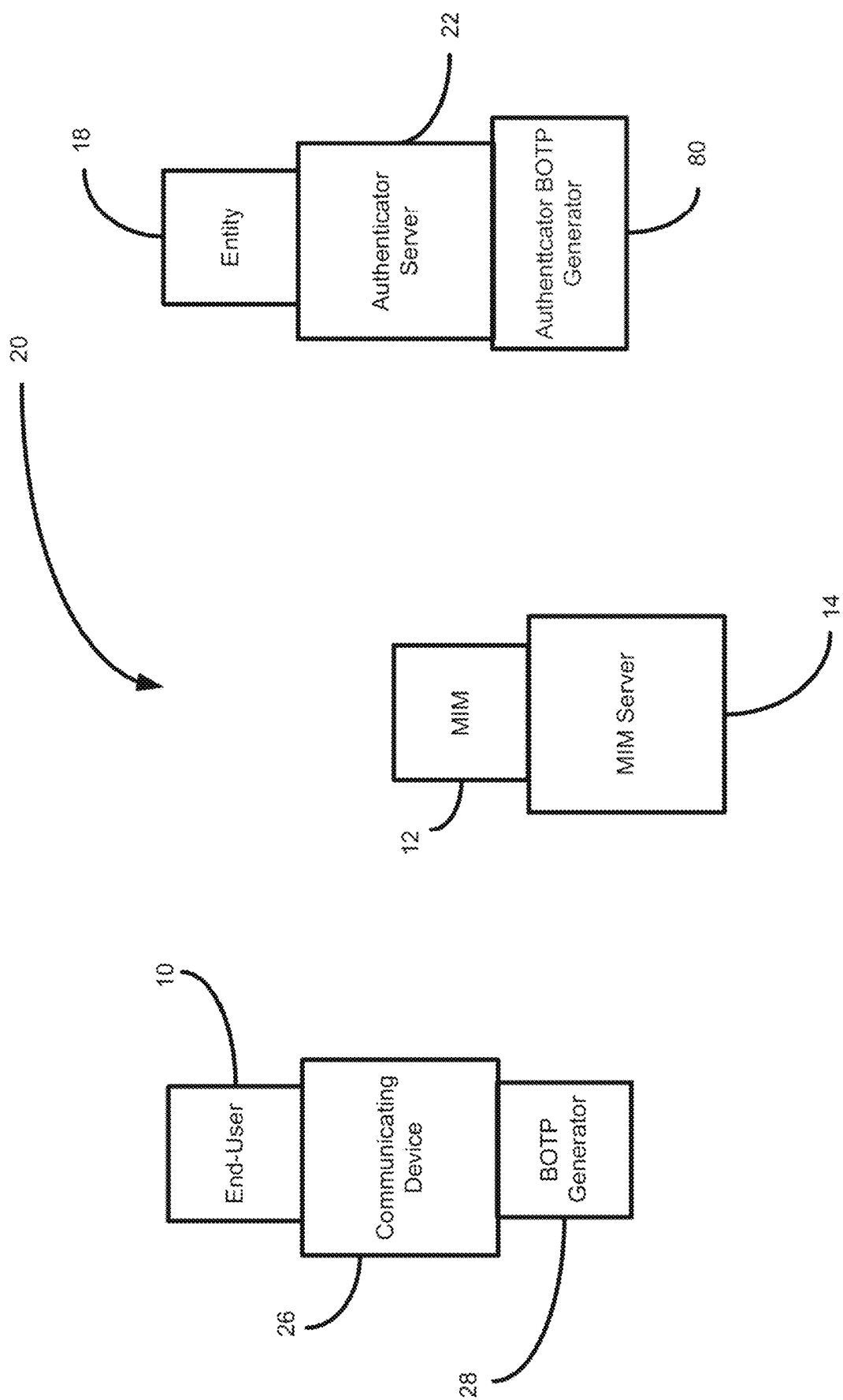
FIG. 2 is a simplified block diagram of key components of an authentication system in one embodiment of the present invention.

FIG. 2 is a simplified block diagram of key components of an authentication system 20 in one embodiment of the present invention. The authentication system 20 includes the end-user 10 communicating with an authentication server 22 and an entity 18. The entity 18 communicates with the end-user 10 and the authentication server 22. The system 20 is utilized to thwart phishing and MIM attacks by the MIM 12 and the MIM server 14 by the end-user 10 having a communicating device 26.

As a review, the MIM 12 utilizes phishing emails in which the end-user (victim) is lured into clicking onto a URL link that leads to where the end-user's browser/app communicates with the MIM server. In such cases, the MIM server 12 acts as a proxy and submits requests and responses on behalf of the victim end-user and eventually results in session and account hijacking by the MIM 12.

In the present invention, to detect MIM attacks and reject credential submissions that are proxied (submitted by the MIM for impersonating the end-user), the system 20 utilizes the following steps. For an account utilizing the end-user 10 and authentication server 22, a shared secret is preferably established prior to any transaction and authentication. The shared secret is securely stored on the end-user's device 26, preferably in a key chain on the user device and is also stored on the authentication server. The shared secret may take various forms, such as a QR code, plaintext, other textual or visual signals. This shared secret is preferably transmitted over an encrypted channel securely, such as in SSU/TLS. In addition, the end-user 10 is equipped with a "bearer-sensitive" one time to use passcode (BOTP) generator 28 residing in the communicating device 26 of the end-user and is capable of generating one-time to use "bearer-sensitive" tokens. The BOTP generator generates this bearer-sensitive token by combining the shared secret with a unique differentiating observable attribute UDOA footprint as observed by the authentication system or UDOAs that differentiates between any two entities communicating over the Internet. For example, the end-user communicating device 26 and/or application and the any other communicating entity on the Internet (for example a MIM server acting as a proxy) have different routing and IP addresses, which are examples of UDOAs, as long as both are not under the same proxy to the external Internet. While one of the UDOAs is an IP address as observed outside of the end-user communicating device 26 network external IP, if behind a proxy, which is initiating to authenticate, it should be noted that the UDOA of the communicating entities are configurable and encompasses a broad range of attributes including, but not limited to IP addresses, MAC addresses, or any specific attributes that are pre-configured and agreed upon with the authentication server (pre-agreed parameters). If such pre-agreed parameters are missing, the authentication server can reject and abort the authentication session.

Several methods can be devised for generating a BOTP by the BOTP generator 28. One such method is to use hash algorithms, such as SHA256, MD5, etc., to convert the UDOA of the end-user communicating device to a hash and subsequently combine it with the shared secret pre-established as well as any other universal parameters, such as time, counters to generate OTP, etc. For example, the BOTP can be calculated as follows:

UDOA Footprint=F (all the UDOAs, Pre-agreed attributes, time)

Where F can be any transformation function including but not limited to SHA256, SHA512, Bcrypt etc.

New Secret=G (UDOA footprint, Pre-shared secret)

Where G is another preselected/pre-agreed transform function can be similar or different from F BOTP=H (new secret, time, pre-agreed attributes)

In addition, F may be a crypto function such as sha256 and format specific generating mathematical computations. One of the forms that F can take is the hash-based message authentication code (HMAC). If the end-user communicating device 26 is in a different network than the OTP generating app, such as cell-phone apps, the "bearer-sensitive" OTP generating app/device (BOTP) can determine the unique and differentiating observable attributes (UDOA) of the communicating entity such as end-user device or browser IP address through various mechanisms. One such mechanism is to leverage the hotspot of the authenticating end-user network or machine-generated unique attribute.

Another method is to explicitly ask the end-user to enter a secret of the communicating device 26 as seen by the external network and enter that into the BOTP generator 28 in order to generate the BOTP. Various other channels such as Bluetooth, NFC etc. may also be used to determine the externally UDOAs of the communicating entities. A provision to input directly the pre-agreed secret and any unique externally observable differentiating attributes between communication entities, IP address or session ID etc., for which the BOTP needs to be generated can also be provided manually or automatically via electronic communication. While the BOTP generator 28 of the end-user 10 computes the BOTP (end-user derived), the authentication server 22 also independently generates a BOTP (authentication server derived). To accomplish this, the authentication server 22 retrieves the perceived UDOA of the entity communicating with the authentication server. If the MIM intercepts and is proxying communications, the UDOA shall be from the MIM. If the end-user is communication with the authentication service, the UDOA is from the end-user communicating device 26. Next, the authentication server 22 retrieves the shared secret for the end-user (usually based on the user-ID), combines the UDOA in a similar manner as discussed for the end-user derived BOTP and computes the OTP using an authenticator BOTP generator 80 in a similar manner symmetrically (mirrors the same operations) as done at the client (end-user) BOTP generator 28 and likewise performs a similar algorithm as discussed above. If the BOTP submitted to the authentication server 22 matches the local BOTP calculated for the authentication session (i.e., the BOTP calculated by the sender and the BOTP calculated by the authentication server BOTP generator 80), the client session is authenticated and will proceed to set cookies and other session related attributes for that post-authentication session. However, if the submitted BOTP does not match the BOTP generated at the authentication server, a MIM 12 is detected and the credentials are rejected, and the authentication aborted. This is a very critical step as not only does this prevent credential stealing (account take over), but also denies the MIM attacker the opportunity to steal session cookies and session-hijack. It should be noted that the MIM does not have the shared secret as it is not disclosed by either authentication server or client and the BOTP generated using the UDOA (e.g., IP address, etc.) of end-user would be different from the BOTP calculated at the authentication server where the MIM UDOA is different (e.g., MIM IP address). The aborting of the authentication session may include session termination, and as such the MIM attacker would not receive any authenticated session cookies and session related parameters to continue. In addition, the authenticating server 22 may report the IP address of the rejected credentials to a compiled blacklist and further publish the information as a phishing IP site to a threat intelligence network.

Figure 3:
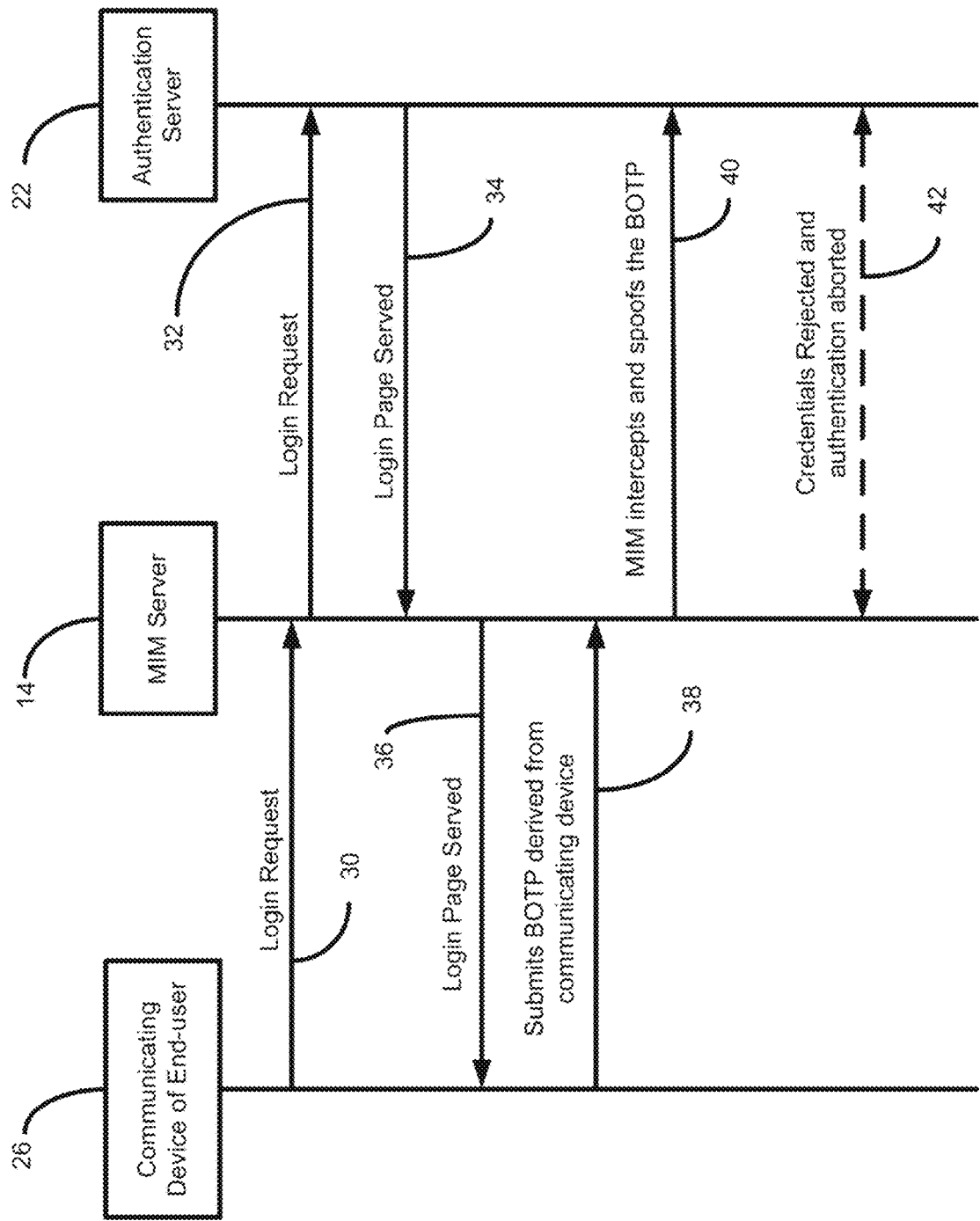
FIG. 3 is a diagram illustrating a MIM attack and system detection and counter of the attack in one embodiment of the present invention.

FIG. 3 is a diagram illustrating a MIM attack and system 20 detection and counter of the attack in one embodiment of the present invention. To Illustrate the present invention, FIG. 3 illustrates where the end-user 10 receives a phishing email from the MIM 12 using the system 20. The phishing email requests the end-user 10 to login to a website of the entity 18. First, the end-user, through the communicating device 26, requests the login page at 30. Unknown to the end-user, the communicating device 26 communicates the login request to the MIM server 14. The MIM server 14, acting as a proxy also requests the login page to the authentication server 22 at 32. Next, at 34, the login page is sent to the MIM server 14. The MIM server 14 in turn sends the login page to the communicating device 26 at 36. The login page requests specific information/credentials of the end-user 10. Thus, at 38, the end-user using the BOTP generator generates a bearer sensitive OTP (BOTP) and sends it to the MIM server 14. The MIM server 14 then intercepts and spoofs the BOTP by sending the OTP of the end-user to the authentication server 22 with the UDOA of the MIM server at 40. The authentication server independently determines the correct BOTP for the end-user and determines if there is a match to the received BOTP. As the MIM server has a different UDOA then the communicating device 26 of the end-user 10, the BOTPs do not match and the credentials are rejected, and the authentication aborted at 42.

Figure 4:
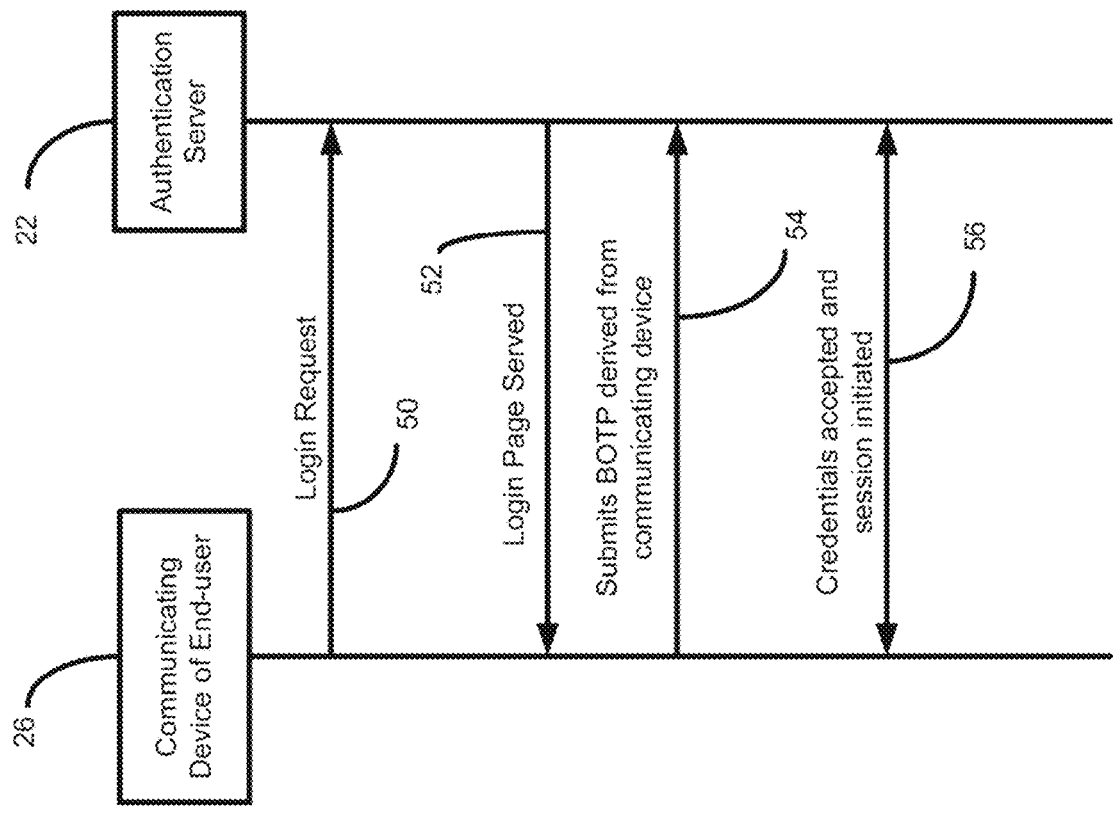
FIG. 4 is a diagram illustrating a normal login session where there is no MIM in one embodiment of the present invention.

FIG. 4 is a diagram illustrating a normal login session where there is no MIM in one embodiment of the present invention. In this scenario, the end-user legitimately wishes to log into the website of the entity 18. First, the end-user, through the communicating device 26 requests the login page at 50 to the authentication server 22 at 52. Next, at 52, the login page is served to the communicating device 26. The login page requests specific information/credentials of the end-user 10. Thus, at 54, the end-user using the BOTP generator, generates a BOTP and sends it to the authentication server 22. The authentication server independently determines the correct BOTP for the end-user and determines if there is a match to the received BOTP. As the communication device has the UDOA providing one of the keys to the correct BOTP, the BOTP is found to match and the credentials are accepted, and the session initiated at 56.

Figure 5A:
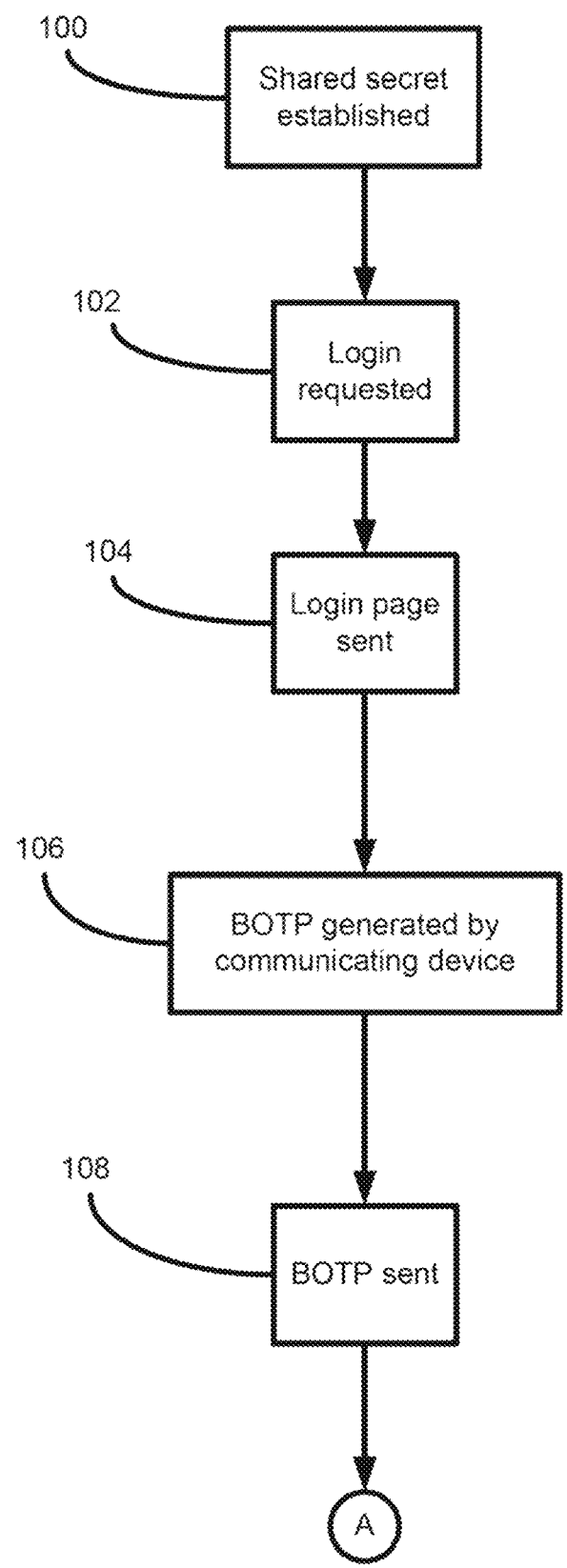
FIGS. 5A and 5B are flowcharts illustrating the steps of detecting a phishing attack by a MIM.
Figure 5B:
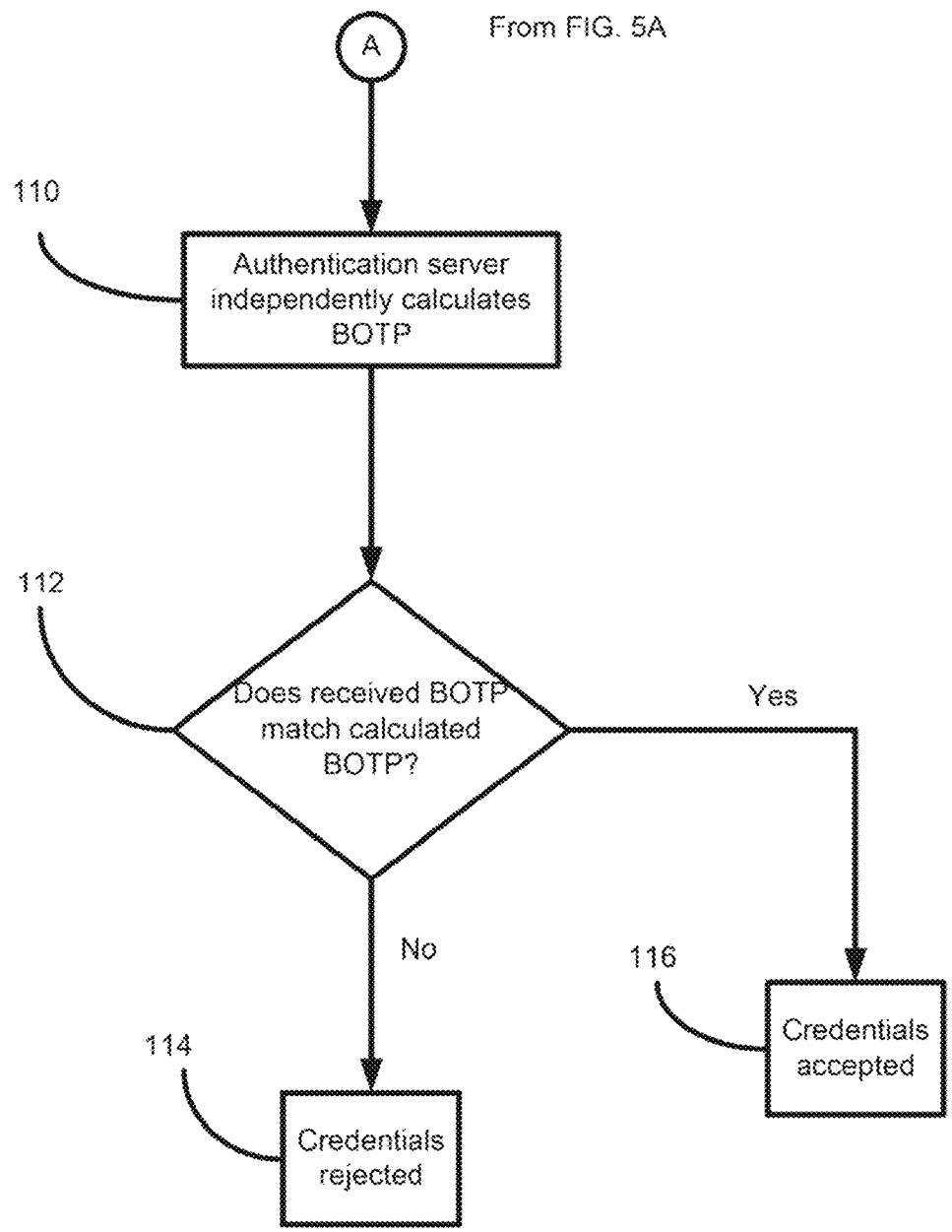

FIGS. 5A and 5B are flowcharts illustrating the steps of detecting a phishing attack by a MIM. With reference to FIGS. 2-5, the method will now be explained. The method begins with step 100 where the end-user 10 and authentication server 22 establish a shared secret prior to any transaction and authentication. The shared secret is stored on the end-user's device 26, preferably on an app on the communicating device 26 and is also stored on the authentication server. The shared secret may take various forms, such as a QR code, plaintext, other textual or visual signal. This shared secret is preferably transmitted over an encrypted channel securely, such as in SSL/TLS. Next, in step 102, the end-user requests a login page from the authenticating server 22. If a phishing attack is being attempted, the login request will first be sent to the MIM server and in turn to the authentication server 22. Next, in step 104, the authentication server 22 sends the login page. If there is a MIM involved, the login page is first sent to the MIM and then in turn to the communicating device 26. If there is no MIM, the login page is sent directly to the communicating device. The login request includes a request for credentials. To facilitate the session, the end-user must provide the correct BOTP. Using the BOTP generator 28, a bear-sensitive token is generated at step 106. The BOTP generator generates this bearer-sensitive token by combining the shared secret with a UDOA or UDOAs that differentiates between any two entities communicating and performing a predetermined function or algorithm. Next, in step 108, the BOTP is transmitted by the communicating device. If a MIM is present in the process, the BOTP is sent to the MIM which in turns sends the BOTP with the MIM servers UDOA to the authentication server 22. If there is no MIM present, the BOTP is sent directly from the communicating device 26 to the authentication server 22. Next, at step 110, the authentication server 22 retrieves the shared secret for the end-user (usually based on the user-ID), combines the UDOA of the known communicating device 26 in a similar manner as discussed for the end-user derived BOTP and computes the BOTP through the authenticator BOTP generator 80 in a similar manner symmetrically (mirror the same operations) as done at the client BOTP generator 28 and likewise performs a similar algorithm as discussed above. Next, in step 112, it is determined by the authentication server 22 if the BOTP received matches the computed BOTP derived by the authentication server. If a MIM is sending the BOTP, it includes the UDOA of the MIM server 14 and not the UDOA of the communicating device 26 and thus is an incorrect BOTP. If there is no MIM, the authentication server 22 detects the UDOA of the communicating device 26 and determines a match of the BOTP with the calculated BOTP derived by the authentication server 22. In step 112, if it is determined that the received BOTP does not match the calculated BOTP derived by the authentication server, the method moves to step 114 where the credentials are rejected, and the session terminated. The aborting of the authentication session may include session termination, and as such the MIM attacker would not receive any authenticated session cookies and session related parameters to continue. In addition, the authenticating server 22 may report the IP address of the rejected credentials to a compiled blacklist and further publish the information as a phishing IP site to a threat intelligence network. However, in step 112, if it is determined that there is a match between the received BOTP and the calculated BOTP derived by the authentication server 22, the method moves to step 116 where the credentials are accepted, and a session is stabled.

The Network Address Translator (NAT) has a primary role to conserve public IP address space and may assign the same external IP to all devices behind it. Thus, any device behind the NAT will have the same external IP address as seen by the network outside of the NAT over the Internet. There are three scenarios where the end-user, MIM and the authentication server are positioned. In the first scenario, the end-user 10, the MIM 12 and the authentication server 22 all are on different IP networks; thus, their IP addresses are different. This is the most common case of the Internet phishing and MIM attacks. In this case, to implement the BOTP, the IP address of the end-user external facing (IP-EUEF), the MIM IP address (IPMIM), and the OTP calculated by the end-user is submitted to the authentication system (perhaps via MIM as a proxy). The authenticator server calculates the similar onetime OTP which sees the IPMIM as the IP address of the communicating party who is claiming to have the right credentials. As expected, there would be a mismatch of the BOTPs and thus the MIM would be detected and rejected on the submission of the credentials.

In the second scenario, the end-user and MIM are behind the same NAT/Proxy, while the authentication server is outside the NAT network. In this case, if there were only one external public IP address to work with by the NAT (or proxy), it is likely to result in both the end-user (victim) and MIM (which is behind NAT and in the same network) to have same external IP address as seen by the authentication system. As such, only the IP address as UDOA for the BOTP will be augmented with additional parameters set by the NAT/Proxy and consumed by both authentication system and the BOTP generator. Furthermore, there are ways to address this issue of detecting the MIM in the same network as the end-user and the same NAT/proxy. First is to have more than one public facing IP addresses with the NAT that it can assign randomly to connections over the Internet when translating internal non-routable IP addresses to external routable IP public addresses. In this case, it will be a probabilistic case (<1) that MIM will have same IP external facing pubic address as the end-user (victim). The other is to have additional differentiating attributes to calculate the BOTP and thus the MIM behind the NAT would be unable to spoof the BOTP submitted by the end-user as MIM's. These could be internal, non-routable IP addresses (e.g. 192.168.x.x), MAC addresses which would be unique to each of the end-users behind the NAT/proxy. Furthermore, at the server end, a pool of IP addresses that need special treatment and additional factors that can be set by the proxy and taken into account by both the BOTP generator of the communicating device and authentication server. Such mechanisms can be preconfigured depending on the architecture and risk containment.

In the third scenario, all three nodes (end-user, MIM and authentication server) are within the same network. This would also make the MIM IP address as seen by the authentication server different as the end-user's UDOA (e.g., IP address, MAC addresses) and thus, if any MIM attack, would be detectable by the BOTP which is calculated respectively by the end-user and the authentication system.

The present invention also provides a reliable way of detecting an MIM phishing attack for resetting an account. For example, when the end-user forgets a $1^{st}$ factor dynamic passcode routine as in any knowledge-based first factors such as password or answers to pre-agreed questions, or the original BOTP generator or app is corrupted, lost, or damaged. Typically, the attack sequence for an account reset request by the phishing MIM begins by the MIM attacker sending a phishing email to the victim end-user stating that an account reset is necessary. The end-user then clicks on the provided URL and tries to reset the account, unaware that the current session traffic is being proxied by the MIM. As such, the MIM passes on the reset codes sent by the authentication server to the end-user 10 (via SMS, email or any other method) or plain OTPs and can then take over the account completely. This is because the reset code is again "bearer-agnostic" and hence can be used by anyone that possesses the reset code, in this case the MIM. To prevent this scenario, fallback pre-shared secrets may be utilized, without revealing them explicitly, and generating a BOTP with the fallback shared secrets and UDOA attributes by the communicating device 26 of the end-user that is compared with a similarly generated BOTP at the authentication server. In order to detect and cut-off the MIM from using the reset token code, the user may utilize the following steps to counteract the MIM phishing attempt for an account reset. First, the end-user starts with initiating a new BOTP generator 28 for the communicating device 26, but without the original shared secret. The end-user can input a fallback shared key, that is stored securely. This fallback shared key may be any code, phrase, text, such as a passphrase or any secondary secret that is pre-shared with the authentication server as well as the UDOA of the end-user device app, or browser. Next, the end-user sends the generated "reset" BOTP containing the fallback shared key, UDOA, etc. to the authentication server. It should be noted that the pre-shared secrets alone are never sent over the network. The authentication server 22 then generates a corresponding BOTP token in a similar manner but with the perceived UDOA that is communicating and currently trying to reset the account. If the reset BOTP sent by the end-user and the locally generated BOTP by the token generator of the authentication server match, then there is no MIM detected and thus the authentication server and end-user can proceed to reset and properly setup of the series of BOTP token generation to the point where the reset account can be initiated. If a MIM is detected, the authentication system can abort and send a notification to the end-user with the details. This reset "bearer-sensitive" OTP token is very important. This is because as a novel concept introduced by the present invention, the BOTP can only be used by the user with the correct UDOA and the shared secret. It should be noted that a back-up BOTP generator can also be pre-configured at or after the initial account setup and activated so that the user can use the backup-BOTP generated codes to reset the account securely. If the UDOA of the MIM and the end-user are detectable, a MIM attack can be thwarted.

Figure 6:
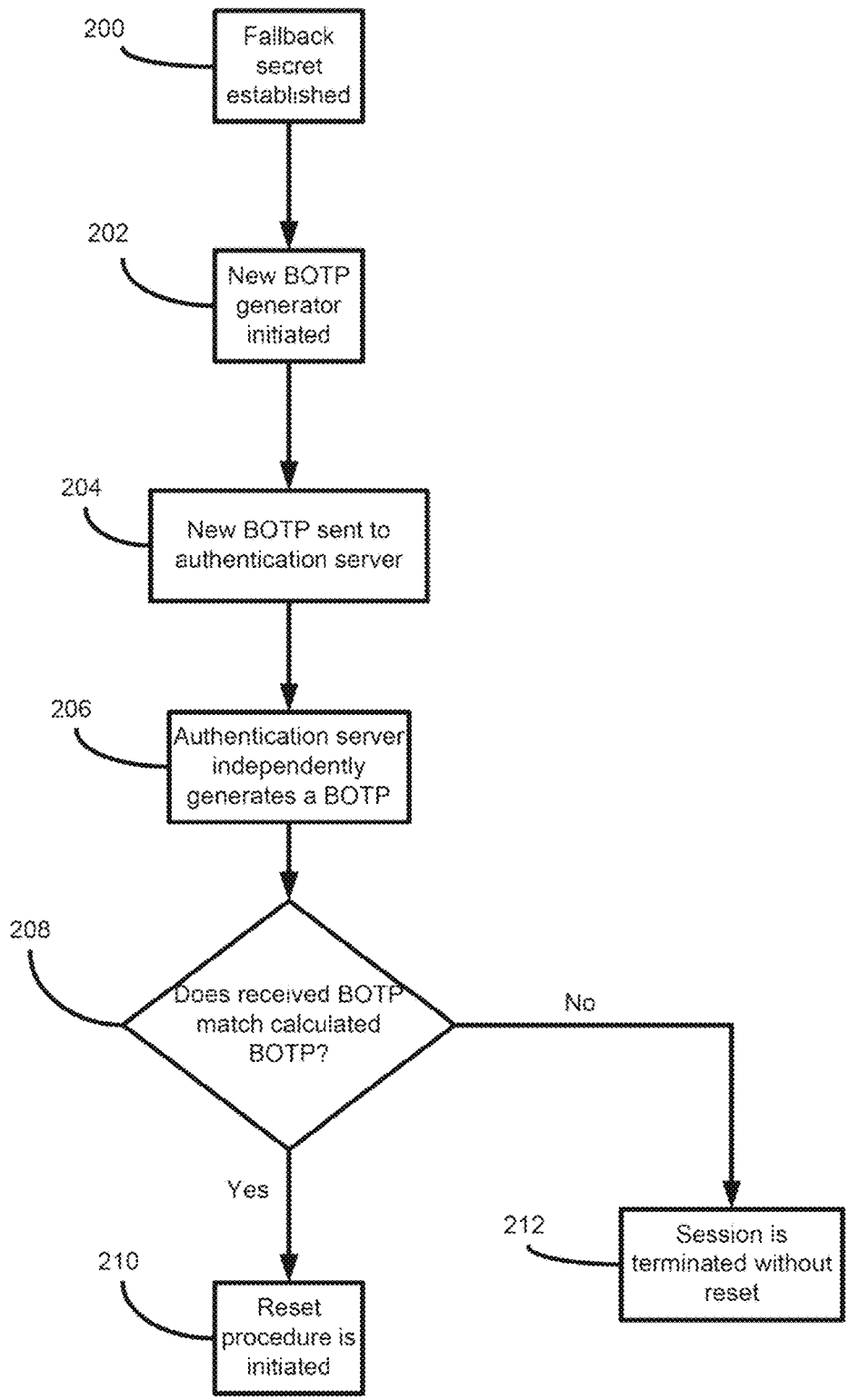
FIG. 6 is a flowchart illustrating a method of detecting an MIM phishing attack for resetting an account.

FIG. 6 is a flowchart illustrating a method of detecting an MIM phishing attack for resetting an account. As discussed above, when the end-user forgets a $1^{st}$ factor dynamic passcode routine or the original BOTP generator or app is corrupted, lost, or damaged the following method may be utilized. In step 200, fallback pre-shared secrets are established between the authentication server 22 and the communicating device 26. Next, in step 202, the end-user 10 initiates a new BOTP generator 28 for the communicating device 26 but inputs a fallback shared key that is stored securely. This fallback shared key may be any code, phrase, text, such as a passphrase or any secondary secret that is pre-shared with the authentication server as well as the UDOA of the end-user. Next, in step 204, the end-user sends the generated "reset" BOTP containing the fallback shared key, UDOA, etc. to the authentication server. It should be noted that pre-shared secrets alone are never sent over the network. The method then moves to step 206 where the authentication server 22 generates a corresponding BOTP token in a similar manner but with the UDOA that is communicating and currently trying to reset the account. In step 208 it is determined by the authentication server 22 if the reset BOTP sent by the end-user and the locally generated BOTP by the token generator of the authentication server match. In step 208 if it is determined that there is a match, it means there is no MIM detected and the method moves to step 210 where the authentication server and end-user can proceed to reset and properly setup the account. However, in step 208 if it is determined by the authentication server 22 that there is not a match, it signifies that a MIM is detected and the method moves to step 212 where the authentication server aborts the session sends a notification to the end-user with the details.

Figure 7:
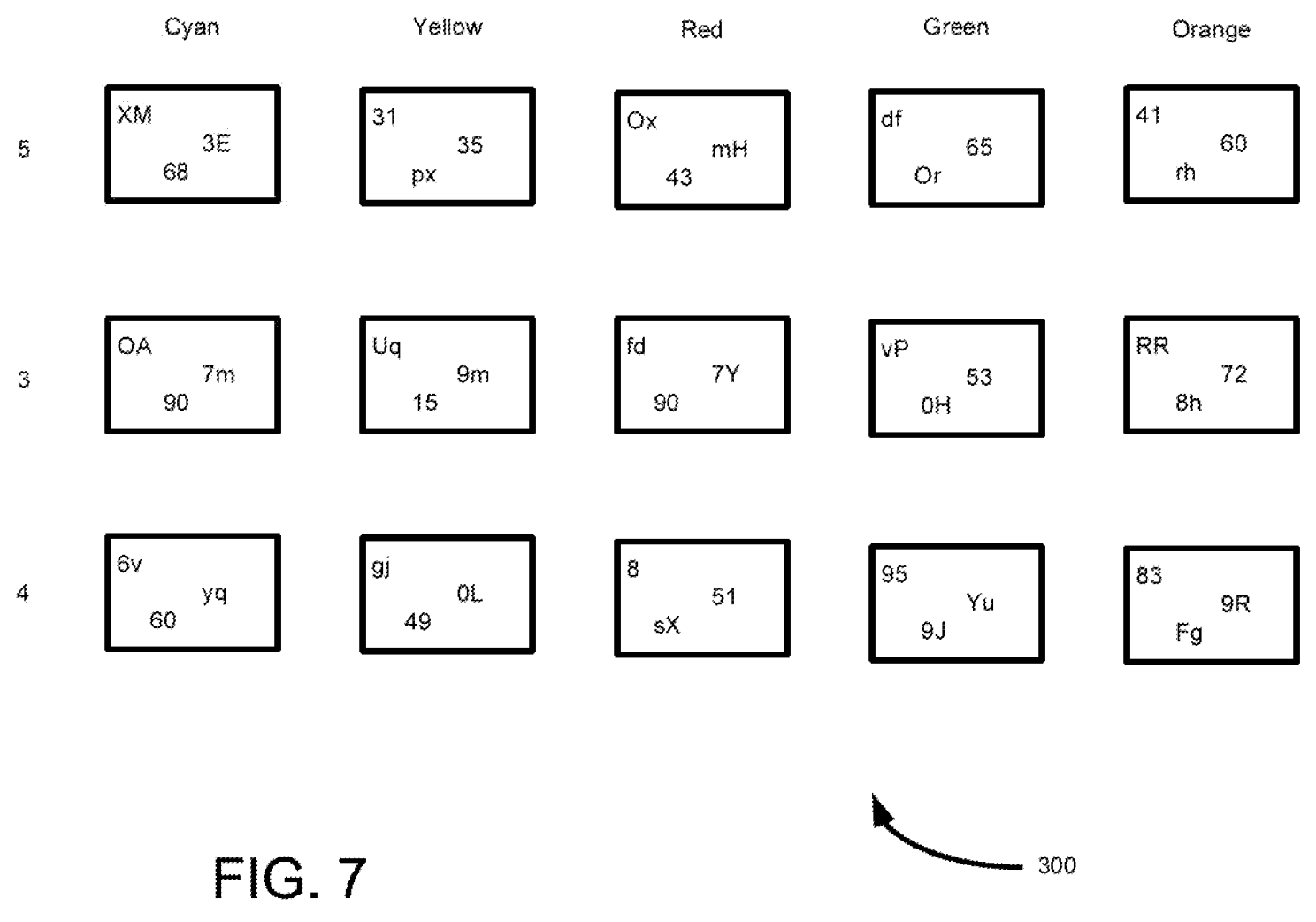

In addition, for both reset and non-reset accounts authentication processes, a public encryption key such as an RSA or similar can be pre-shared with the authentication server 22, while the private encryption key is stored on the end-user end (i.e., communicating device 26). The BOTP may be signed/encrypted by the end-user with the private key and may be decrypted/verified by the authentication with the public key to verify it is coming from the end-user, while the bearer-sensitive BOTP ensures an MIM cannot submit it on behalf of the end-user. This will mitigate the risk of authentication server compromise, in that even if shared keys are compromised, the private key is still with the end-user that is not revealed during authentication server compromise. In one embodiment of the present invention, the 2-factor authentication utilizes a challenge grid where a challenge is given to the end-user and the challenge grid is utilized to correctly answer. FIG. 7 illustrates a challenge grid 300 where the end-user uses a challenge to derive an answer from the grid and process the data as per a pre-shared process/rule and submits the result of the processing as a human-generated one-time 1' factor OTP along with the newly created BOTP.

The present invention provides many advantages over existing authentication systems. The present invention provides an OTP which is bearer sensitive meaning the origin of the OTP is critical in determining if a MIM or a true communicating device 26 of the end-user is transmitting the OTP. This provides a defense against a MIM phishing attack. The present invention does not require any changes to the existing infrastructure and protocols. Additionally, the present invention does not require additional capital expenditures, such as extra dongle hardware and is truly a customizable software. The present invention is also both useable and convenient where the user can utilize the present invention by use of a mobile phone.

Figure 8:
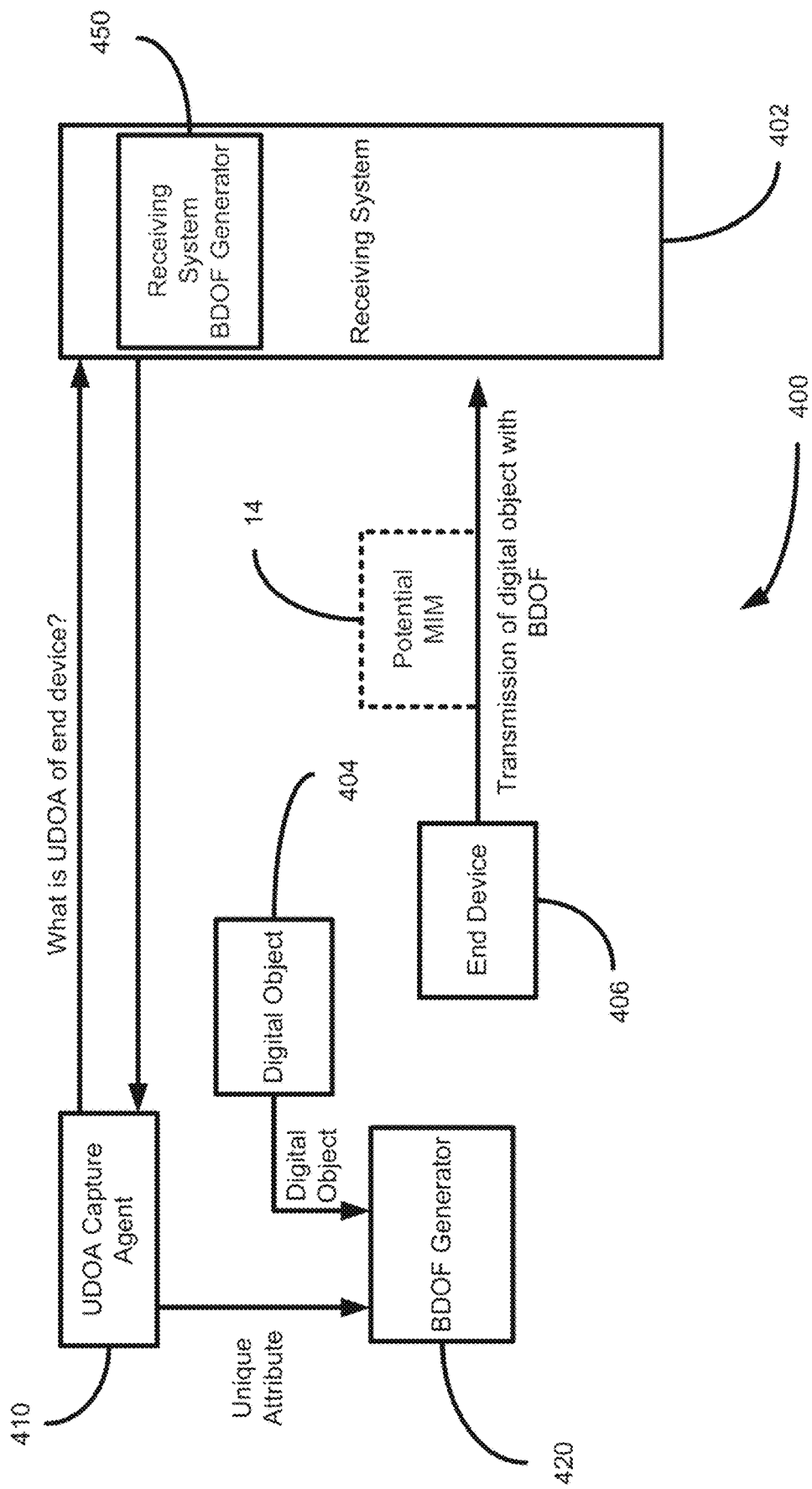
FIG. 8 is a simplified block diagram illustrating an authentication system for detecting an MIM during transmission of a digital object in another embodiment of the present invention.

The BOTP system for detecting undesired spoofing of submission of credentials can be extended to any digital objects, such as but not limited cookies, files, digital tokens, etc. In another embodiment of the present invention, the end-user communicating device (agent) communicates directly with the intended receiving system to compute the Bearer-sensitive Digital Object footprint (BDOF) based on the conveyed UDOA(s) by the end-system, any pre-agreed attribute of the Digital object that is sent, and at least one pre-shared secret. FIG. 8 is a simplified block diagram illustrating an authentication system 400 for detecting an MIM during transmission of a digital object in another embodiment of the present invention. FIG. 8 illustrates a receiving system 402 receiving a digital object 404 from an end device 406. A UDOA capture agent 410 obtains the UDOA of the end device. A BDOF generator 420 calculates the BDOF. Upon calculation, the digital object is sent along with the computed BDOF to the receiving system 402. The receiving system 402, upon receiving the digital object 404, through a receiving system BDOF generator 450, computes the BDOF based on the UDOA of the communicating entity, a pre-agreed attribute of the digital object and the pre-agreed shared secret, in a similar manner as discussed above for the BOPT and checks if the received BDOF matches with the computed BDOF calculated by the receiving end. If they do not match, a MIM attack is detected and the receiving system 402 rejects the digital object 404 and any transactions associated with the exchange. The calculation of the BDOF follows a similar process, except that in addition to the UDOA attributes of the sending end-device, the unique digital object attributes are also taken into account by the BODF generator. For example, a hash (SHA256 and any pre-agreed function between communicating parties) that generates a fingerprint of the digital object can be used for the BODF generation. Note that any proxy (potential MIM 14) lacks the pre-shared secret between the sending and receiving systems and will not be able to generate an attacker's BDOF and substitute it for the legitimate BDOF computed and transmitted along with the digital object. The receiving system may reject the digital object if is not accompanied with the BODF computed at the senders' end (end device 408, or if the locally computed BDOF doesn't match with the received BDOF.

Figure 9:
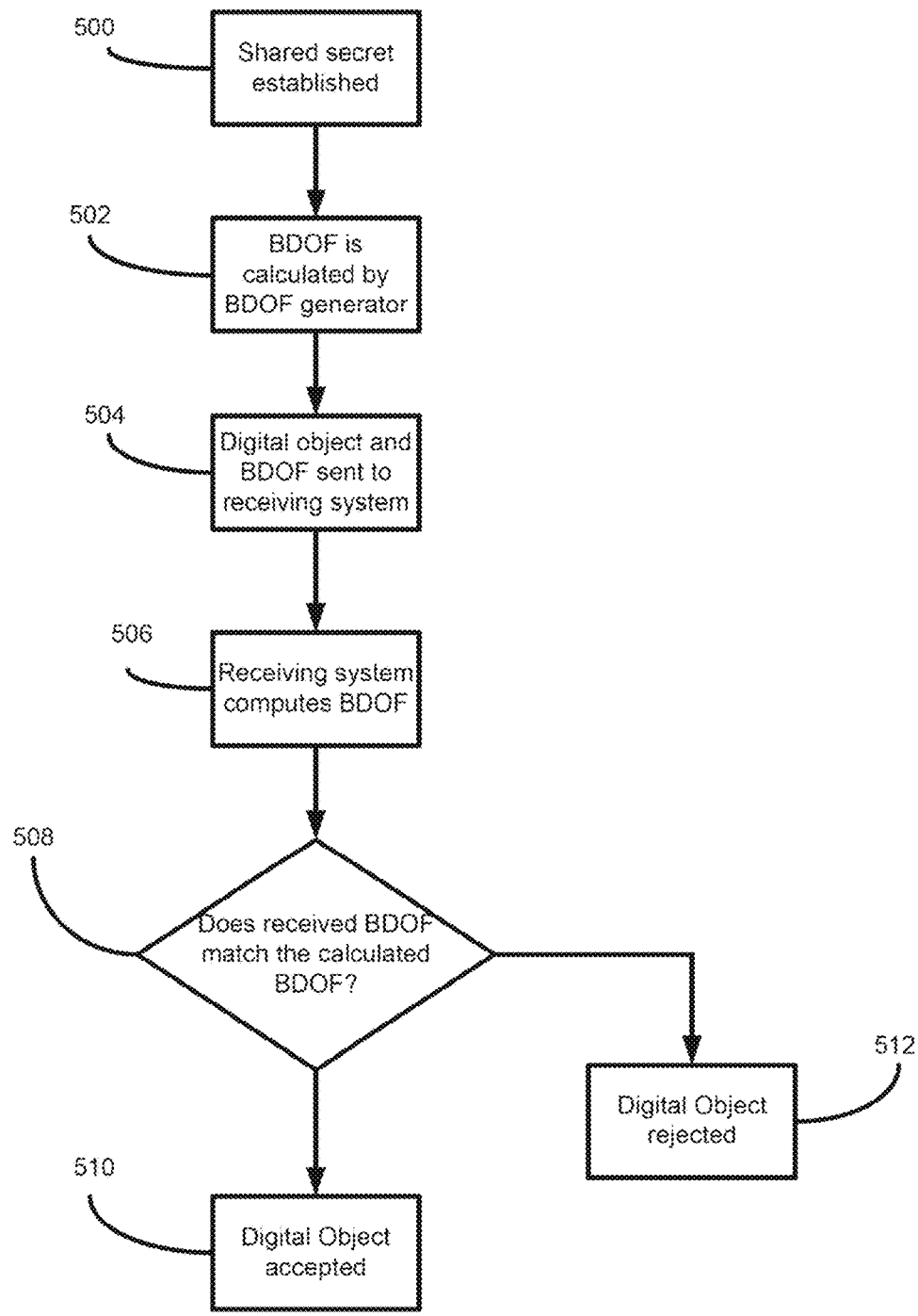
FIG. 9 is a flowchart illustrating the steps of detecting a spoof of a digital object according to the teachings of the present invention.

FIG. 9 is a flowchart illustrating the steps of detecting a spoof of a digital object according to the teachings of the present invention. With reference to FIGS. 8 and the 9, the method will now be explained. The method begins with step 500 where a secret is shared between the receiving system 402 and the end device 406. Next, in step 502, the BDOF generator 420 calculates a BDOF for the digital object 404. The calculation of BDOF follows a similar process as in BOTP generation, except that in addition to the UDOA attributes of the sending end-device, the unique digital object attributes are also taken into account by the BODF generator. For example, a hash (SHA256 and any pre-agreed function between communicating parties) that generates a fingerprint of the digital object can be used for the BODF generation. The method then moves to step 504 where the digital object and the BODF are sent to the receiving system 402. In step 506, the receiving system 402 computes by the receiving system BDOF generator 450, a BDOF based on the UDOA of the communicating entity, a pre-agreed attribute of the digital object and the pre-agreed shared secret, in the similar manner as discussed above for the BOPT. In step 508, it is determined if the received BDOF matches with the computed BDOF by the receiving system 402. In step 508, if it is determined that the BDOFs match, the method moves to step 510 where the digital object is accepted. However, in step 508, if is determined that the BDOFs do not match, the method moves to step 512 wherein the digital object is rejected.

In another embodiment of the present invention, bearer sensitivity can be extended to other scenarios outside of just BOTP generation. For example, an HTTP cookie may be augmented to ensure the cookie is transformed into a bearer sensitive cookie by collecting the UDOA attributes of the communicating device/session and appropriately running through the transformation function, such as G (cookie, UDOA) which results in a unique capture of the cookie and UDOA of the communicating entity. It should be noted that this "bearer-sensitive" transformed entity is not equivalent to a digital signature or hash, and the case uses are different. The purpose of the "bearer-sensitive" is to ensure the originator is submitting/transmitting the cookie (or any information) so that if any intermediate malicious proxy is intercepting and submitting it, it can be detected at the receiving system. This bearer aware information exchange can also be interchangeable between multi-receiving and sending communication parties. The present invention thus can be used to detect MIM proxy, intercepting, echoing or relaying back the data between two original communicating parties. Furthermore, in the case of post user-authentication, the session cookies and access/authorization tokens may be accompanied by additional BDOFs computed and set by the verifying (receiving) system. As such, when the cookies and tokens are stolen and spoofed, the receiving/verifying system may validate and detect the spoofing with the locally computed BDOF for the communicating channel/sending system. If the MIM is spoofing, the BDOFs would mismatch and the session transactions may be aborted, even after the post-authentication phase, unlike current bearer-agnostic post authentication cookies.

Thus, the receiving system (whether using a BOTP or a BODF) computes a local BOTP or BODF based on the UDOA of the observed device communicating with it. If there is a proxy or man-in-middle that is spoofing or submitting the BOTP or Digital object with a BODF, the locally computed BOTP/BDOF at the receiving end, fails to match the received BOTP or the BODF computed at the sender end. This is due to the fact that the UDOA/BOTP (BDOF) of the sender and the MIM would be different and hence, the resulting computed BOTP/BODF. In another embodiment of the present invention, the BOTP/BODF generator may use partial UDOAs. For example, if an IP address is used, it may be a subset of an IP address (masked) that is used as an UDOA component in the BOTP generator. This gives mobility to the end device, but still remains in the original subnet.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

What is claimed is:

1. An authentication system for securing against a phishing attack by a Man in Middle (MIM) on an end-user, the system comprising:
    a communicating device of the end-user having an externally observable attribute; and
    an authentication server for determining if the MIM or the end-user is communicating with the authentication server;
    a unique differentiating observable attributes (UDOA) agent associated with the communicating device and configured to generate pre-agreed attributes from the communicating device and send the pre-agreed attributes to the authentication server;
    wherein the authentication server is configured to calculate a UDOA footprint derived from a combination of the externally observable attribute of the communicating device and the pre-agreed attributes from the communicating device;
    wherein the authentication server is configured to send the UDOA footprint to the UDOA agent;
    wherein the communicating device is associated with a bearer sensitive one-time password (BOTP) generator for generating a specific BOTP based upon the UDOA footprint of the communicating device received from the authentication server;
    wherein the communicating device is configured to submit the specific BOTP to the authentication server;
    wherein the authentication server calculates an authentication server BOTP derived from the calculated UDOA footprint;
    wherein the authentication server determines if the received specific BOTP matches the authentication server BOTP calculated by the authentication server;
    wherein the authentication server terminates an authentication session if the received BOTP does not match the BOTP calculated by the authentication server.

2. The authentication system according to claim 1 wherein the authentication server and the BOTP generator share a secret.

3. The authentication system according to claim 2 wherein the secret is pre-agreed upon by both the authentication server and the communicating device.

4. The authentication system according to claim 3 wherein the secret is pre-agreed by using a secure communication channel.

5. The authentication system according to claim 2 wherein the specific BOTP generated by the BOTP generator of the communicating device is derived using a combination of the shared secret, the pre-agreed attributes, and the external observable attributes.

6. The authentication system according to claim 5 wherein the specific BOTP is generated using a predetermined hash algorithm.

7. The authentication system according to claim 1 wherein an IP address of the communicating device is one of the externally observable attributes.

8. The authentication system according to claim 1 wherein MAC address of the communicating device is utilized as one of the pre-agreed attributes.

9. The authentication system according to claim 1 wherein the UDOA footprint utilizes time as a variable in determining the UDOA footprint.

10. The authentication system according to claim 1 wherein a browser IP address of the communicating device is one of the externally observable attributes.

11. The authentication system according to claim 1 wherein the authentication server is configured to terminate the authentication session by aborting the authentication session.

12. The authentication system according to claim 11 wherein the authentication server is configured to report an IP address where there is not a match between the received specific BOTP and the authentication server BOTP calculated by the authentication server for a threat intelligence network.

13. The authentication system according to claim 11 wherein the authentication server and the communicating device are configured for resetting an account by establishing a pre-shared fallback secret for generating a new BOTP during an account reset.

14. The authentication system according to claim 13 wherein the pre-shared fallback secret is utilized and combined with the externally observable attribute of the communicating device with a newly established BOTP generator for use during the account reset.

15. A method of securing against a phishing attack by a Man in Middle (MIM) on an end-user, the method comprising the steps of:
    generating and sending, by a unique differentiating observable attributes (UDOA) agent associated with a communicating device, pre-agreed attributes from the communicating device of the end-user to an authentication server;
    wherein the communicating device has an externally observable attribute;
    calculating, by the authentication server, a UDOA footprint derived from a combination of the externally observable attribute of the communicating device and the pre-agreed attributes from the communicating device;
    sending the UDOA footprint to the UDOA agent;
    calculating a bearer sensitive one-time password (BOTP) by a BOTP generator associated with the communicating device based upon the UDOA footprint received from the authentication server;
    sending the BOTP to the authentication server;
    calculating, by the authentication server, an authentication server BOTP derived from the UDOA footprint;
    determining by the authentication server if the received BOTP matches the authentication server BOTP calculated by the authentication server; and
    terminating a authentication session if the received BOTP does not match the BOTP calculated by the authentication server.

16. The method according to claim 15 further comprising the authentication server and communicating device sharing a secret.

17. The method according to claim 16 wherein the shared secret is used to calculate the BOTP.

18. The method according to claim 16 wherein the step of sharing the secret includes sharing the secret over a secure communication channel.

19. The method according to claim 15 wherein the step of calculating the BOTP includes deriving the BOTP using the shared secret, the externally observable attribute, and the pre-agreed attributes of the communicating device.

20. The method according to claim 19 where the BOTP is calculated using a predetermined hash algorithm.

21. An authentication system for detecting spoofing of a transmission of a digital object, the system comprising:
a sending device having a digital object and an externally observable attribute;
a receiving system configured for receiving digital objects;
a unique differentiating observable attribute (UDOA) agent associated with the sending device and configured to generate pre-agreed attributes of the sending device and send the pre-agreed attributes to a Bearer-sensitive Digital Object footprint (BDOF) generator;
wherein the BDOF generator generates a BDOF derived from a combination of the externally observable attribute of the sending device, a shared secret between the sending device and the receiving system, and the pre-agreed attributes of the sending device, wherein the BDOF generator sends the BDOF to the sending device;
wherein the sending device is configured to send the BDOF with the digital object to the receiving system;
wherein the receiving system is configured to independently calculate a receiving system calculated BDOF derived from a combination of the externally observable attribute of the sending device, the shared secret, and the pre-agreed attributes of the sending device;
wherein the receiving system is configured to determine if the received BDOF matches the receiving system calculated BDOF;
wherein the receiving system rejects the digital object if the received BDOF does not match the receiving system calculated BDOF.

22. The authentication system according to claim 21 wherein the receiving system is configured to reject any further transaction associated with the sending device if the received BDOF does not match the receiving system calculated BDOF.

23. The authentication system according to claim 21 wherein the BDOF is generated using a predetermined hash algorithm.

24. The authentication system according to claim 21 wherein the UDOA agent generates a pre-agreed attribute of the digital object.

25. A method of detection of spoofing during a transmission of a digital object, the method comprising:
establishing a shared secret between a receiving system and a sending device having a digital object;
wherein the sending device includes an externally observable attribute;
generating and sending, by a unique differentiating observable attribute (UDOA) agent, pre-agreed attributes from the sending device to a Bearer-sensitive Digital Object footprint (BDOF) generator;
calculating, by the BDOF generator, a BDOF derived from a combination of the externally observable attribute of the sending device, a shared secret between the sending device and the receiving system, and the pre-agreed attributes of the sending device;
sending the BDOF and the digital object to the receiving system;
independently calculating, by the receiving system, a receiving system BDOF based on the shared secret, externally observable attribute, and pre-agreed attributes of the sending device;
determining by the receiving system if the received BDOF from the sending device sending the BDOF matches the receiving system BDOF; and
rejecting the digital object if the received BDOF does not match the receiving system BDOF.

26. The method according to claim 25 wherein the BDOF is calculated using a time variable to derive the BDOF.

27. The method according to claim 25 further comprising rejecting any further transaction associated with the sending device if the received BDOF does not match the receiving system calculated BDOF.

28. The method according to claim 25 wherein the BDOF is calculated using a predetermined hash algorithm.

29. The method according to claim 25 wherein the step of generating and sending, by the UDOA agent, pre-agreed attributes from the sending device to the BDOF generator includes generating and sending pre-agreed attributes of the digital object.

* * * * *